(12) United States Patent
Davidson et al.

(10) Patent No.: US 10,664,827 B2
(45) Date of Patent: *May 26, 2020

(54) SECURING ONLINE TRANSACTIONS VIA HARDWARE IDENTIFICATION

(71) Applicant: INTERNATIONAL BUSINESS MACHINES CORPORATION, Armonk, NY (US)

(72) Inventors: Bryan P. Davidson, Seattle, WA (US); Nader M. Nassar, Yorktown Heights, NY (US); Annette S. Riffe, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,440

(22) Filed: Dec. 18, 2017

(65) Prior Publication Data
US 2018/0204208 A1  Jul. 19, 2018

Related U.S. Application Data

(63) Continuation of application No. 15/410,201, filed on Jan. 19, 2017.

(51) Int. Cl.
*G06Q 20/34* (2012.01)
*G06Q 20/38* (2012.01)
*G06Q 20/40* (2012.01)

(52) U.S. Cl.
CPC ........ *G06Q 20/34* (2013.01); *G06Q 20/382* (2013.01); *G06Q 20/401* (2013.01)

(58) Field of Classification Search
CPC ...... G06Q 20/34; G06Q 20/382; G06Q 20/40; G06Q 20/401
See application file for complete search history.

(56) References Cited

U.S. PATENT DOCUMENTS 6,618,858 B1  9/2003  Gautier
8,826,401 B1  9/2014  Fang et al.
(Continued)

OTHER PUBLICATIONS

Stavish, Matthew W.; List of IBM Patents or Patent Applications Treated as Related; Dec. 18, 2017; 1 page.

*Primary Examiner* — Suezu Ellis
(74) *Attorney, Agent, or Firm* — Schmeiser, Olsen & Watts; Jeffrey S. LaBaw (57) ABSTRACT

A method, program and system are provided for securing electronic transactions. A payment card processor server computer receives a payment authorization request message, the payment authorization request message being generated in response to an electronic payment transaction request made by a user, wherein the payment authorization request message includes first encrypted payment account information for a first payment device. The payment card processor server computer receives a first hardware device ID associated with a first hardware device that generated the payment authorization request message, wherein the first hardware device is associated with a user payment account for the user. The server computer determines that the first encrypted payment account information from the received payment authorization request message matches the first hardware device ID, and the purchase request is completed.

8 Claims, 5 Drawing Sheets

(56) References Cited

U.S. PATENT DOCUMENTS

| | | |
|---|---|---|
| 9,344,424 B2 | 5/2016 | Tenenboym et al. |
| 2004/0193553 A1 | 9/2004 | Lloyd et al. |
| 2007/0138261 A1 | 6/2007 | Flinchem |
| 2009/0144204 A1* | 6/2009 | Hurry ................. G06Q 20/085 705/71 |
| 2012/0101938 A1 | 4/2012 | Kasower |
| 2013/0332358 A1* | 12/2013 | Zhao ..................... G06Q 20/12 705/44 |
| 2014/0279545 A1* | 9/2014 | Enns ..................... G06Q 20/24 705/44 |
| 2016/0155120 A1 | 6/2016 | Hurry |
| 2017/0124565 A1 | 5/2017 | Arora et al. |
| 2018/0060865 A1* | 3/2018 | Dean ...................... H04L 67/42 |
| 2018/0204207 A1* | 7/2018 | Davidson ............. G06Q 20/382 |

\* cited by examiner

FIG 1 (Prior Art)
Transaction Authorization

SECURING ONLINE TRANSACTIONS VIA HARDWARE IDENTIFICATION

CROSS REFERENCE TO RELATED APPLICATIONS

This application is a continuation application claiming priority to Ser. No. 15/410,201 filed Jan. 19, 2017, the contents of which are hereby incorporated by reference.

TECHNICAL FIELD

The present invention relates to systems, devices and methods that facilitate electronic commerce transactions.

BACKGROUND

Consumers, product and service merchants, purchasing and sales agents, suppliers, manufacturers, credit card and debit card companies and banks have all seen process improvements including improved payment processes due to advances in electronic commerce technology. Buyers can now find desired products through Internet searches and can purchase goods and services through secure online channels. Transactions may be processed almost instantly leading to faster delivery of the purchased item, media content, or service.

Credit cards in stores are authenticated by several mechanisms such as physical possession of the card and signature verification. Online; however, cards do not have these mechanisms available. One aspect of online transactions is the common concern of theft of payment account information. Generally the user of a credit card with an online vendor assures possession of the card by entering the expiration date and the CVV code. Absent some means of verifying the user of the card, online credit card use is very susceptible to fraud. Someone who knows the card number and CVV code can use the card without the owner's permission.

Accordingly, e-commerce systems typically include, when the user chooses to make a purchase, the establishment of an encrypted tunnel between the merchant and the customer so that payment account information may be transmitted safely. Typically, a secure page is provided to the customer to prompt the customer to enter a payment account number and other required account information. A merchant server then validates the account information as a part of completing the transaction. Thereafter, a purchase confirmation is generated in one of a variety of formats to the customer.

SUMMARY

The present invention provides a method, program and system for securing electronic transactions. A payment card processor server computer receives a payment authorization request message, the payment authorization request message being generated in response to an electronic payment transaction request made by a user, wherein the payment authorization request message includes first encrypted payment account information for a first payment device. The payment card processor server computer receives a first hardware device ID associated with a first hardware device that generated the payment authorization request message, wherein the first hardware device is associated with a user payment account for the user. The server computer determines that the first encrypted payment account information from the received payment authorization request message matches the first hardware device ID, and the purchase request is completed.

DETAILED DESCRIPTION OF THE INVENTION

Figure 1:
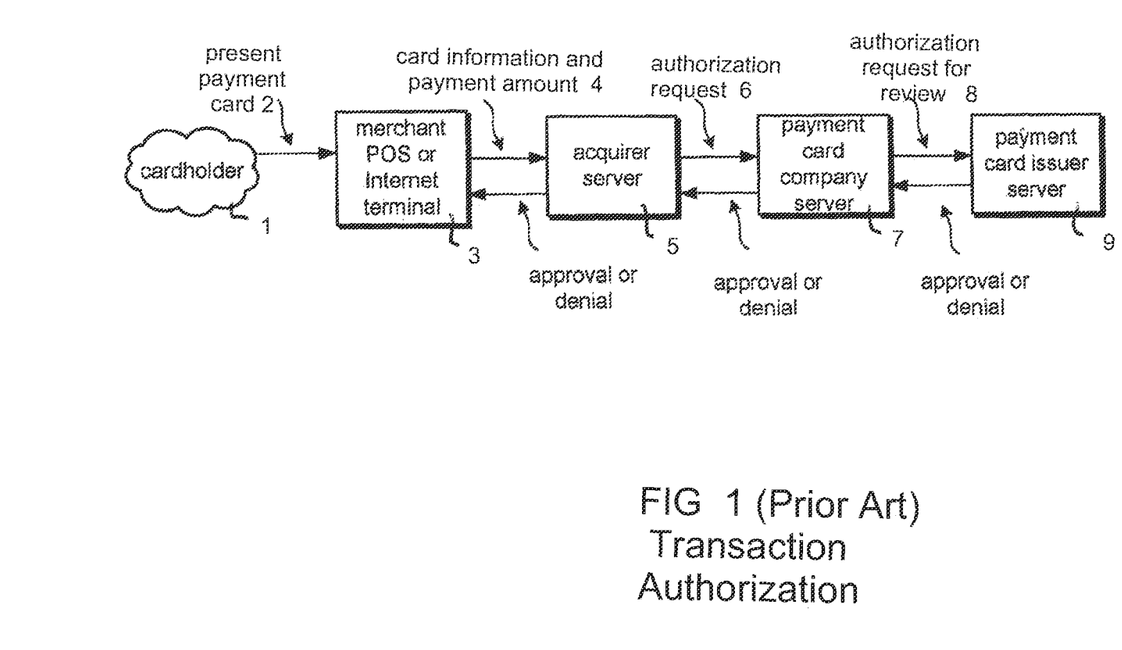
FIG. 1 is a functional diagram that illustrates a payment card authorization process that can support a typical e-commerce transaction according to the prior art.

FIG. 1 is a functional diagram that illustrates a payment card authorization process that can support a typical e-commerce transaction according to the prior art. As illustrated in FIG. 1, a cardholder 1 initially presents a payment card 2 to a merchant point of sale or Internet terminal 3. Specifically, the card 2 is presented to a point of sale terminal 3 or, as described previously, the account information is presented to the terminal through secured data entry over the Internet. Thereafter, the merchant produces card and payment information 4 to an acquirer server 5. An acquirer is a payment card association member that initiates and maintains relationships with merchants that accept payment cards. Thereafter, the acquirer server 5 produces an authorization request 6 to a payment card company server 7 for review. The payment card company then sends the authorization request 6 for review 8 to the appropriate payment card issuer 9. The payment card issuer then issues an approval or denial that is propagated back to the merchant.

To provide enhanced security when completing online transactions, additional verifications can be incorporated in accordance with this invention. Rather than just providing the credit card information which can be easily compromised, a user can add additional security to the user's account by complementing this existing verification with hardware-based verification as well. When completing an online transaction, the user will authenticate to the retailer via the credit card information and the user's device will provide a unique hardware identifier to the online retailer during the transaction. This hardware identifier may, for example, take the form of a SIM card id (ISSI) in a mobile device, a unique network-based ID such as a MAC address, or the serial number of the laptop being used to complete the transaction. Other forms of hardware identification may be employed. The retailer may then verify with the credit card issuer that the provided credit card information and the device identifier are linked together and the payment can be completed. Likewise, multiple credit cards and multiple hardware devices may be linked in this manner.

Figure 2:
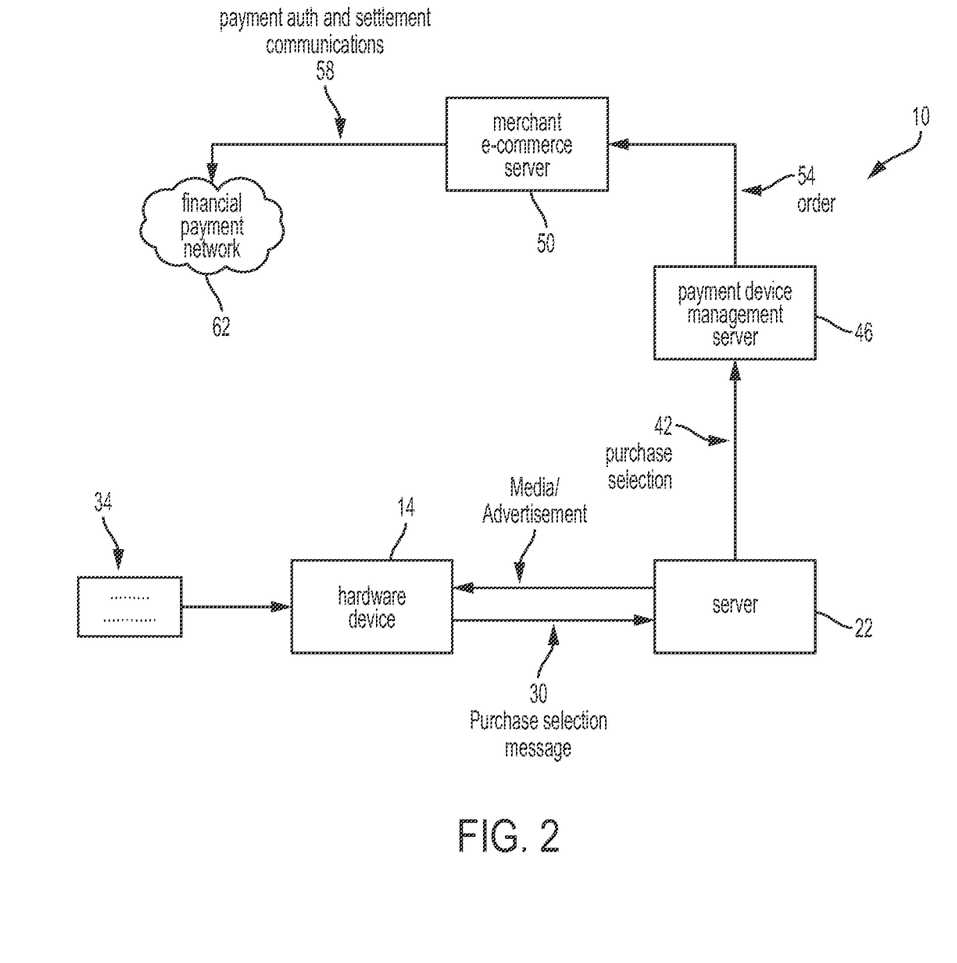
FIG. 2 is a functional block diagram of a system that illustrates a process flow for an electronic payment authorization system according to an embodiment of the present invention.

FIG. 2 is a functional block diagram of a system 10 that illustrates one embodiment of a process flow for an electronic payment authorization system according to an embodiment of the present invention. The payment method described in FIG. 2 is provided only as an example is not intended to limit the present invention to any specific type of transaction method other than those features set forth in the appended claims. The electronic payment authorization feature supported by the systems, networks, devices and methods of the various embodiments of the invention allow a user to initiate a purchase of an advertised item by interaction with a hardware device, such as a phone, tablet, laptop, personal computer, etc., that may established an association with a payment account enabling the user to manually enter necessary payment account information.

To achieve this functionality, devices, systems, networks, and/or associated method steps generally support a process to generate a payment account that has an established association with a specific hardware device. References herein to a hardware device are references to any type of device that can communicate over an IP network, a public network including the Internet, cable TV, satellite TV networks, and other types of networks that support data communications. The payment accounts may be card based in the form of a plastic bank card, a smart card, a dedicated SIM card, or may be in an electronic format and not require a physical form factor (i.e., electronically stored and encrypted account information). Additionally, while the embodiments shown typically refer generally to a hardware device it should be understood that a software based module that operates with generic hardware (for example, a personal computer, laptop, cell phone, smart phone, tablet, etc.) may serve as the hardware device described that supports operation described in relation to at least one of the embodiments of the invention.

Generally, the system and processes described with reference to FIG. 2 illustrate a process that with which a hardware device supports an electronic purchase transaction, wherein the purchase transaction is made by an authorized hardware device. Hardware device 14, which may be any one of a cell phone, personal computer, tablet, laptop, etc., may be configured to send and receive transactional information over a computer network, a data packet network, a cable network, a satellite network, or a traditional broadcast television network. Hardware device 14 may also receive, simultaneously or separately, media via a plurality of transmission channels. For example, server 22 may receive broadcast Internet media, advertisements, news articles, social media, search engines, as well as television programming, movies, music, etc. over a cable network cable connection or as a wireless broadcast transmission received via wired or wireless communication. The server 22 may convert the received broadcast transmission programming to a packet format for delivery to hardware device 14 via a computer network. In addition, server 22 may deliver media received from other media sources to hardware device 14 over the data packet network or the computer network.

Server 22 produces all varieties of media and advertising as well as purchase options (collectively "advertisement") to hardware device 14 for display upon an associated monitor or display. A purchase selection by the user by interaction with the hardware device 14 in response to an advertisement results in hardware device 14 generating a purchase selection message 30 identifying a specific advertisement or product.

Payment account information is associated with a payment device 34 that is owned by or otherwise controlled by a user to facilitate electronic commerce, such as an online purchase of a product or service. The payment account information includes traditional payment card data such as an account holder's name, an account number, an expiration date, a CVC number, etc. The types of data stored by payment device 34 may include the magnetic stripe equivalent data or a payment account number, account or card expiration date, usage limits including purchase amounts or totals, a permanent ID of an authorized device that has an established association with the payment account, issuer ID, payment account processor ID, and personal identification number. Additionally, in one embodiment, a user mailing address and a user billing address is included. The payment account processor is a company that processes payment account transactions. Historically, such processing has been on the behalf of payment card issuer companies such as banks and other financial institutions. Accordingly, hardware device 14 is operable to receive the account information from payment device 34 and to produce the payment account information within message 30.

In one embodiment in which a payment account is not associated with a physical form factor such as a plastic credit card or SIM card, a payment account secured software module may be installed into the hardware device 14 to support other purchase features.

The hardware device 14 includes an identifying number that is a permanent identification number of the hardware device 14. For example, the hardware device 14 identifying number may be a serial number assigned to hardware device 14. One aspect of this identifying number is that the number is non-modifiable. In an alternate embodiment in which a hardware device comprises a software based module containing the payment account information (for example, one installed in a personal computer), the hardware device identifying number is a non-modifiable identification number associated with the software based hardware device.

In response to receiving purchase selection message 30, server 22 transmits message 42 to a payment device management server 46. Message 42, which operates as a purchase selection indication, includes the hardware device ID and the payment account information. Message 42 may be the same as purchase selection message 30 or may be different but based upon message 30. Message 42 may include additional information such as a billing and shipping address associated with the payment account. Payment device management server 46 then communicates with a corresponding merchant e-commerce server 50 based upon the purchase selection massage 42 and transmits an order 54 to merchant e-commerce server 50. Here, order 54 is one for which payment has not yet been authorized or approved. Merchant e-commerce server 50 then engages in payment authorization and settlement communications 58 with a financial payment network 62 to complete the transaction and, more specifically, to initially receive payment authorization and subsequently payment settlement.

Figure 3:
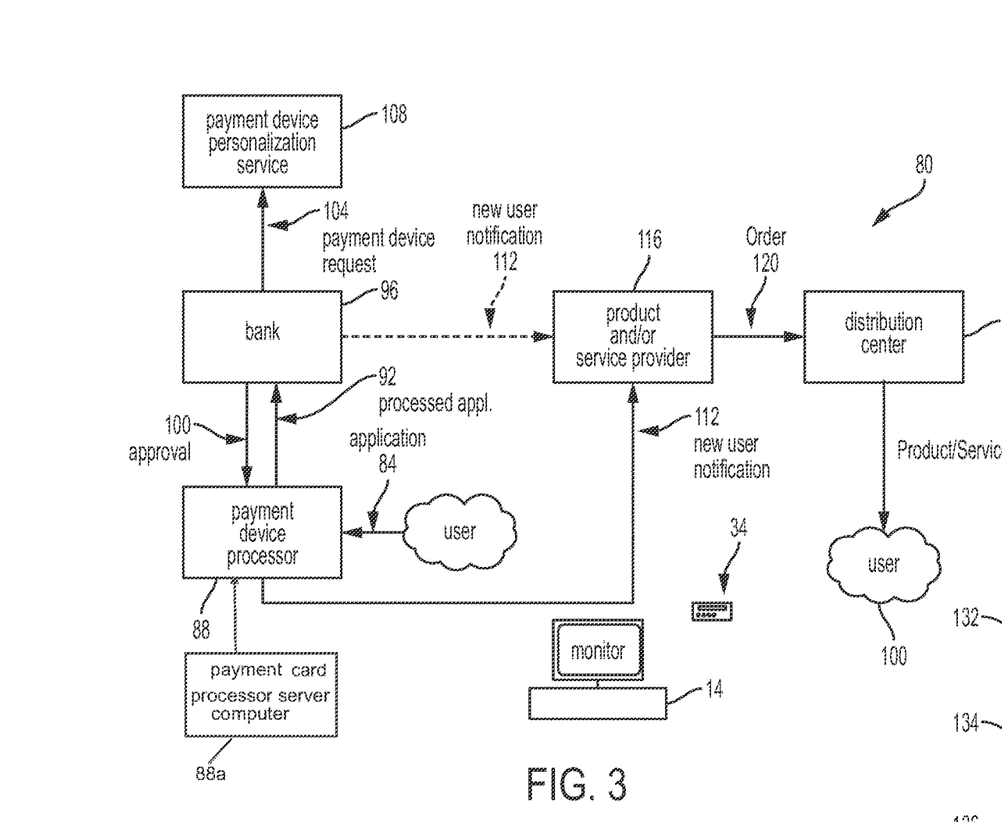
FIG. 3 is a functional block diagram of a system that illustrates a process for creating an established association between an authorized hardware device and a payment account according to one embodiment of the invention.

FIG. 3 is a functional block diagram of a system 80 that illustrates a process for creating an established association; i.e., a transaction authorization and protection service, between an authorized hardware device and a payment account according to one embodiment of the invention. The figures and corresponding text are directed to a hardware device 14 that is capable of receiving data and communicating over at least one of a plurality of network types. In one specific embodiment, hardware device 14 (as described here in FIG. 3) is a personal computer (PC). Alternatively, the hardware device may be a cellphone, a tablet, a laptop, or other communication device. Additionally, in the described embodiment of FIG. 3, the payment account is associated with a payment device 34 illustrated by way of example as a credit card 34. Generally, a process of system 80 supported according to an embodiment of the present invention is one that establishes an association; e.g., a security link, between a user payment account and an authorized hardware device 14, such as PC 14. After such association is made, a purchase selection message 42 (FIG. 2) may be made for the specified user account by the authorized hardware device 14 and the system of this invention recognized the security link that has been made between the hardware device 14 and the payment device 34, thereby providing an additional layer of security for the payment device 34 to avoid fraud and unauthorized purchases using the payment device 34.

The process begins with a user enrolling in a hardware authentication program through the credit card provider or other suitable agency for authorization. During this enrollment, the user may choose to either require (1) hardware authentication for all online purchases, or (2) only require hardware authentication on websites that support this form of authorization. During enrollment, the user may select a range of monetary transactions conducted electronically via said computer, whereby a user may require hardware authentication for only certain online purchases. For example, the user may download and install device drivers/software from the credit card provider or other suitable agency onto the hardware device 14. This software may then be used to link the hardware device 14 to each desired payment device 34; e.g., credit card. Each payment device 34 may be linked to many hardware devices 14. When linking a hardware device 14 to a payment device 34, the hardware device's unique hardware ID is hashed and is sent to the payment device issuer's database where the security link between hardware device 14 and payment device 34 is stored.

In accordance with an embodiment of the present invention, when making an online or electronic purchase, the user will allow (e.g., via a user input such as acknowledging a button or scanning a fingerprint) the on-board driver to send a hash of the unique hardware ID for hardware device 14 to the retailer. The user will thus provide the hardware ID in combination with the payment device 34 information to the retailer. The retailer, in turn, will verify with the payment device 34 issuer that: (1) the payment device 34 information is valid, and (2) that the provided hardware ID matches up with a linked ID hash of the associated payment device 34. Upon verification that the provided payment device information and the hardware ID hash are valid and linked, the online purchase proceeds as expected.

An exemplary process of ordering a product and/or service is illustrated in FIG. 3, whereby a user generates an application 84 for a new payment account and produces the application 84 to a payment device processor 88. Payment device processor 88 is, for example, a credit card company that processes credit cards for issuer companies such as banks and other financial institutions or for the bank itself through payment card process server computer 88a. In general, references herein to "payment device processor" are references to payment device processing entities or companies. The user may utilize a web based interactive program or may physically deliver a paper application to the payment device processor 88, which then produces processed application 92 in an electronic form to bank 96 for processing. Processed application 92 is based on application 84.

While the example of FIG. 3 illustrates the user providing the application directly to payment device processor 88, it should be understood that the user may also deliver the application to any other entity that subsequently provides the application to the payment device processor 88 including bank 96 or other financial provider. Accordingly, payment device processor 88 generates a processed application 92 to bank 96. Bank 96 then approves or denies processed application 92.

Upon approving processed application 92, bank 96 generates an approval 100 to payment device processor 88. Bank 96 may also generate a payment device request 104 to payment device personalization service 108. Upon receiving approval 100, payment device processor 88 generates a new user notification 112 to a product and/or service provider 116. In an alternate approach, bank 96 generates and transmits new user notification 112 to service provider 116 after bank 96 approves processed application 92. Product/service provider 116 then transmits an order 120 to a distribution center 124. Distribution center 124 then ships the product and/or service to the user 100. The product and/or service may encompass any variety of merchandise available over the Internet or otherwise available for purchase by the user 100.

In one embodiment of the invention, payment device 34 is linked to or associated with a serial number or other identification number of hardware device 14. This serial number is a non-modifiable number and is hardware based. Accordingly, subsequent purchase orders can only be approved if the hardware ID number associated with the payment device 34 and the hardware ID of the hardware device match when a purchase selection is made by an authorized hardware device 14 in one embodiment of the invention. The process includes product/service provider 116 providing the hardware ID to either bank 96 or payment device processor 88 for delivery to payment device personalization service 108. In general, the ID of the authorized payment device 14 must match the hardware ID of a hardware device 14 that generates a purchase selection message for an account having an established association with the hardware device before a purchase approval can be generated.

Payment device personalization service 108 is, in one embodiment, an element of a network operable to generate personalized payment devices that include account information as well as encryption keys and other information to support the creation of secure payment devices 34.

The methods and apparatus of the embodiments of the invention are applicable to Internet based hardware devices that operably couple to an associated server from which media content or associated products or services may be purchased over a public network. For example, the concepts herein are applicable to game systems such as the Sony Wii®, Gamecube®, and Xbox® and other similar systems. Generally, though, media content and advertisements for products and services are produced to a display device to allow a user to make purchases associated with the media content and advertisements merely by placing an online order. A display for displaying media with advertising may comprise any known display device including television sets, traditional monitors, LCD displays, or projectors. These displays may be separate or integrated into the hardware device 14. For example, the display may be an LCD screen of an audio player such as an MP3 player. Many such systems include an ability to communicate over an IP network though the ability to communicate over an IP network is not required. Generally, the embodiments include any system that is operable to deliver media to the user device and to receive a purchase indication from the user device through the same or a different network while a purchase transaction is pending.

Figure 4:
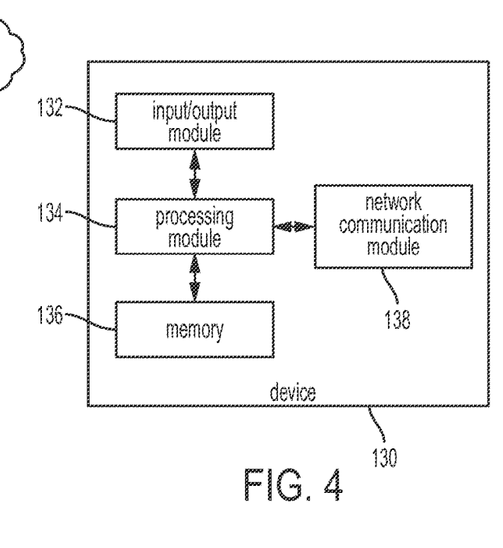
FIG. 4 is a functional block diagram of a computing device that is operable operations and functionality as described in relation to the various aspects of the embodiments of the invention.

FIG. 4 is a functional block diagram of a device 130 that is operable to perform the operations and functionality as described in relation to the various aspects of the embodiments of the invention. For example, device 130 may be used to receive and process an application for a payment account that is to be associated with hardware device 14 according to one embodiment of the invention. While device 130 is described as a device for processing an application for a payment account, the structure and functionality of device 130 may be applied to each computer device or server described here in this specification in relation to prior and subsequent figures. Device 130 includes an input/output module 132 operable to receive user inputs from a keyboard, mouse and other user input devices and further to generate display signals and/or audio signals for display on a display device and for playing sound through a speaker system, respectively, to create a user interface with device 130. As such, device 130 is operable to receive an application directly from a user in addition to receiving the application over the Internet. A processing module 134 is operable to communicate with input/output module 132 and to process incoming signals based upon user input and upon signals received over the Internet. Memory 136 is operable to store computer instructions and data.

The processing module 134 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

Note that when the processing module 134 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-3 and in the Figures that follow FIG. 4.

Continuing to refer to FIG. 4, processing module 134 of device 130 is operable to retrieve computer instructions from memory 136 which instructions define operational logic of device 130 including logic for performing the method steps of at least one embodiment of the invention described herein this specification. For example, the logic defined by the computer instructions support application processing for payment accounts that will be associated with a hardware device 14. Finally, processing module 134 is operable to engage in wireless and wired communications through various data packet networks and wireless communication networks via network communication module 138 to support the various method steps described herein.

More specifically, processing module 134 is operable to communicate with the input/output module 132, network communication module 138, and memory 136 to execute the computer instructions stored within memory 136. Based upon at least one of the stored data in memory 136, the received data from network communication module 138, and the user data entry received from input/output module 132, processing module 134 is operable to receive and process an application for a hardware device 14 associated payment account, transmit an approved application indication, and support or establish an established association between the payment account and hardware device 14.

Figure 5:
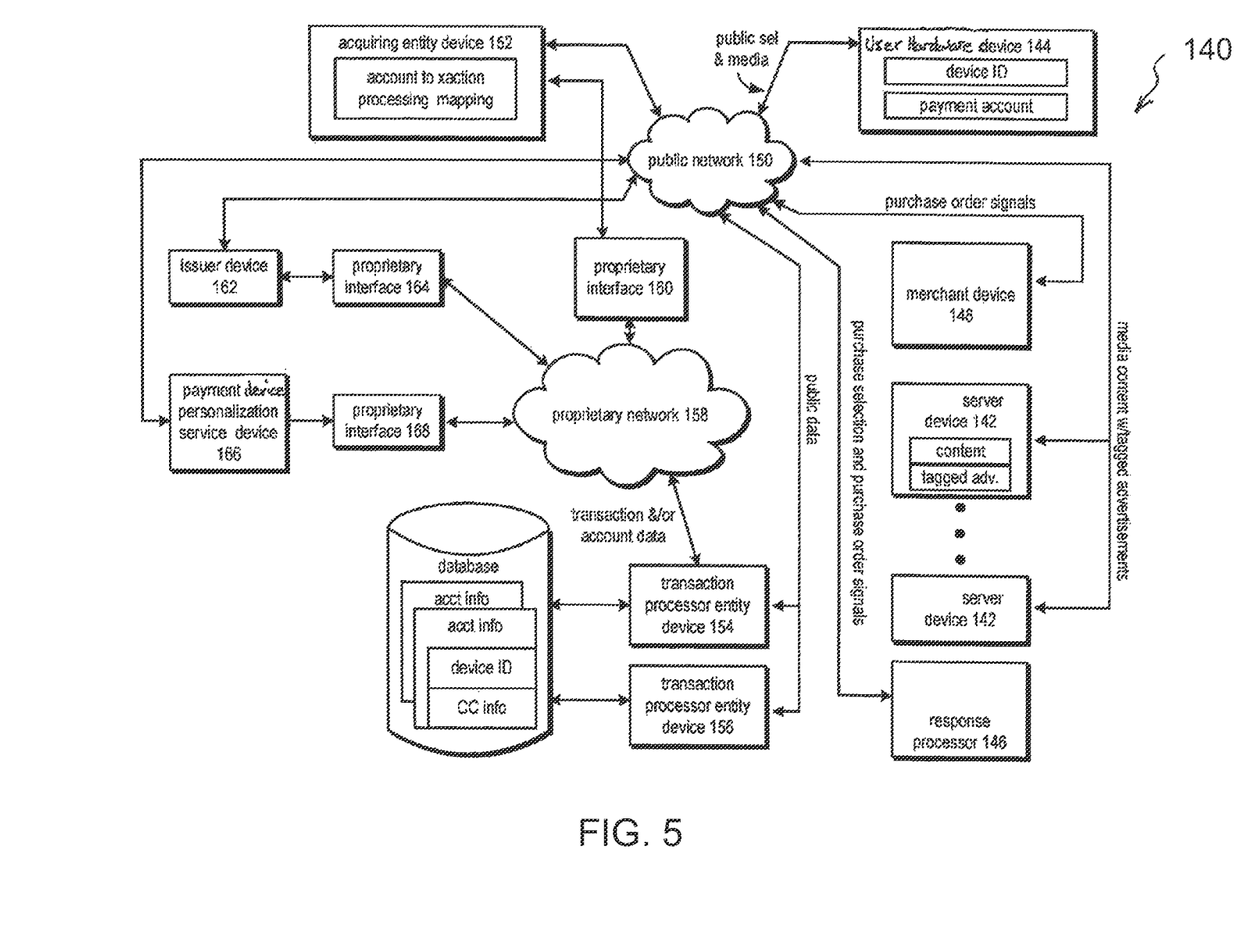
FIG. 5 is a functional block diagram of a network operable for establishing and supporting electronic transactions according to an embodiment of the present invention.

FIG. 5 is a functional block diagram of a network operable for establishing and supporting electronic transactions according to an embodiment of the present invention. Network 140 generally comprises financial network devices that interact with service provider devices, merchant devices and user devices having an ability to establish and subsequently support a purchase selection. More specifically, the network elements or devices of network 140 are operable to initially support creation of personalized payment cards and to subsequently support electronic transactions using the payment cards. Here, the payment device has the data that is partially encrypted to allow access to certain types of data while protecting other types of information. Examples of payment data which may be fully protected, partially protected or not protected all according to implementation include payment account number, expiration date, usage limits including purchase amounts or totals, a permanent ID of an authorized device that has an established association with the payment account, issuer ID, payment account processor ID, and personal identification number. One aspect of network 140 is that network 140 is operable to support an application and account creation process that results in a payment account having an established association with a specified user hardware device from which a user may initiate purchase transactions using the payment account.

Network 140 includes a server device 142, a user device 144, a response processor 146, and a merchant device 148 that are all coupled to communicate through one or more public networks 150. Server device 142 is operable to provide content and tagged advertisements to user hardware device 144.

Server device 142 can be, for example, a device that delivers media by way of wireless communication channels and/or wired networks. The wireless networks can comprise the wireless cellular networks, satellite based wireless networks, or even public wireless local area networks and wireless wide area networks. The wired networks can be any known technology including cable networks for delivering so called broadcast television programming content, the public switched telephone networks, or computer and data networks such as Internet Protocol networks. According to implementation, these various types of networks can be used either for delivery of media content, delivery of communication messages that support an electronic transaction, or both. For example, one type of network may be used for delivering the media content while another is used to conduct purchase related communications. Alternatively, one type of network may be used for both.

Continuing to refer to FIG. 5, network 140 includes an acquiring entity device 152 of a payment card acquirer company that is operable to communicate with merchant device 148 over public network 150 as well as with a payment account processor entity device 154 or 156 of a payment account processor company by way of a proprietary network 158. Acquiring entity device 152 includes a mapping of user payment accounts with transaction processing entities such as credit card processing companies.

A proprietary interface 160 is utilized to enable acquiring entity device 152 to communicate through proprietary network 158. An issuer device 162 also is coupled to communicate through both the public network 150 and through proprietary network 158 by way of interface 164. Similarly, a payment device personalization service device 166 is coupled to communicate through both the public network 150 and through proprietary network 158 by way of interface 168. Finally, as shown, each transaction processor entity device 154 is operable to communicate with one or more databases that include payment account information and a permanent ID of a hardware device from which authorized purchase transactions may be initiated.

In operation, server device 142 is operable to produce media with products or services that may be purchased by a user. Accordingly, user hardware device 144 is operable to receive and play the media content for advertisements or advertised items. Hardware device 144 is also operable to produce purchase selection indications to server device 142 with the advertisements that correspond to the purchase selections. In an alternate embodiment, the purchase selection indications are produced to advertisement response processor 146. Here, a first type of public network delivers media to user hardware device 144 and a second type of network delivers user hardware device responses to server device 142 or to advertisement response processor 146. A public network 150 is used for delivery of the media content though a private network may be used instead.

Once either device 142 or 146 receives a purchase selection indication, device 142 or 146 is operable to forward the purchase selection indication to merchant device 148 over public network 150. Merchant device 148 is then operable to generate and provide a purchase authorization request to acquiring entity device 152. Acquiring entity device 152 then forwards the purchase authorization request to a transaction processor entity device 154 by way of proprietary network 158. The transaction processing entity device then performs several authorization processing steps including evaluating account standing and verifying that all authorization associated data appears to be proper according to implemented guidelines. Transaction processor entity device 154 then forwards the authorization request to a payment account issuer device 162. Payment account issuer device then makes a final authorization decision to approve or deny the authorization request.

User hardware device 144 is operable to provide payment account information and an ID of the user hardware device 144 along with the purchase selection indication. Accordingly, at least one of the server device 142, the advertisement response processor 146, the acquiring entity device 152 and the issuer device 162 is operable to compare the user hardware device ID to the payment account information as a part of determining whether to approve (or forward) the authorization request.

Server device 142 is operably disposed to communicate through public network 150 with merchant device 148 that is identified by the advertisement. Merchant device 148 is further coupled to communicate over public network 150 with acquiring entity device 152 to initiate transaction approval and settlement processing. Generally, acquiring entity device 152 is operable to receive the authorization request for a purchase transaction and to communicate with at least one device in a financial network through a proprietary interface and/or network to request and receive a purchase authorization approval.

An additional aspect of the operation of network 140 is that any of devices 142, 148, 154 and 162 is operable to provide account application information including at least a portion of an account number directly or indirectly to payment device personalization service device 166. Payment device personalization service device 166 is operable to receive the permanent ID of user hardware device 144 to embed the permanent ID within the data stored within the payment device 34. For example, the ID may be stored in a central server along with other account information to create an established association between the account and the user hardware device 144, or the ID may be stored in an encrypted form in a payment device along with other account information to create an established association between the account and the user media device 144.

In an alternate embodiment, an established association between the account and the user hardware device may be created through an initial communication. Here, devices 154 and 162 are operable to establish a common encryption key with one of user hardware device 144 or payment device 34 to generate an encryption key for protecting data in purchase transactions initiated by the (authorized) user hardware device. This encryption key is then used to protect at least a portion of the account information. Accordingly, the encrypted portion of the account information will only be properly decrypted if an authorized hardware ID is provided as a part of a purchase selection since the provided hardware ID will be used to select an encryption key for a received authorization request. In general, a user hardware device ID is transmitted as a part of or in association with a purchase selection and, if the hardware ID is one that has an established association with the payment account identified in the transaction and/or account data, then the transaction may be approved or forwarded to a different device for approval.

Figure 6:
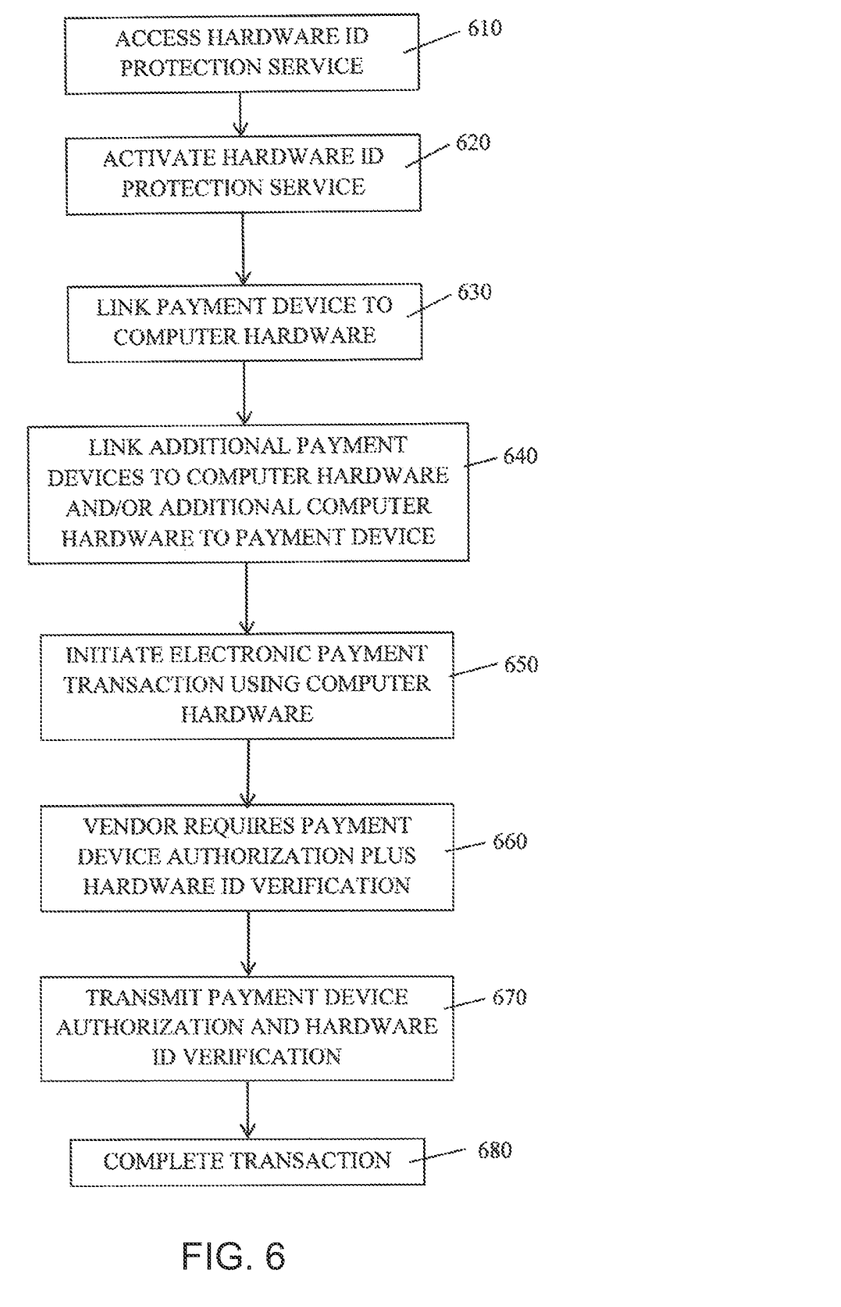
FIG. 6 is a flow chart that illustrates a method for accessing and activating a service to enhance electronic transactions using hardware identification according to an embodiment of the present invention.

FIG. 6 is a flow chart that illustrates a method for accessing and activating a service to enhance electronic transactions using hardware identification according to an embodiment of the present invention. The method includes accessing a hardware identification protection service (step 610) by, for example, downloading and installing device drivers and/or software from a credit card provider or other suitable agency onto the hardware device 14 described above. Once the hardware ID protection service is activated (step 620), the software may be used to link the hardware device 14 to each desired payment device 34, and conversely, each payment device 34 may be selectively linked to one or more hardware devices 14 at steps 630, 640.

The method preferably includes establishing a secure communication link for securely carrying data between a financial network server and a hardware device 34. The financial network server may be a server such as a financial institution server or a payment card processor server. The server and the hardware device communicate with each other to support the step of creating an established relationship between the hardware device and the user payment account.

From the perspective of the hardware device, this step includes transmitting a hardware device ID in relation to the payment account information to support creating the established relationship between the hardware device and the user payment account. From the perspective of the network server, this step includes receiving the hardware device ID in relation to the payment account information and storing and transmitting such information to other servers in the financial network to facilitate processing in which the hardware device ID for a purchase selection message may be compared to the payment account information as a part of approving and settling a purchase transaction. Such an ID, for example, may be mapped to an encryption key that is unique for each authorized hardware device.

Once the user has accessed and activated the hardware protection service according to this invention (steps 610, 620) and created the link between the hardware device(s) 34 and the payment device(s) 14 (steps 630, 640), the user may then proceed to initiate an electronic payment transaction using the authorized hardware device 14 at step 650, which step follows the procedures and functions described above with respect to electronic payment transactions. According the present invention, the hardware protections service would validate the transaction by requiring at step 660 both payment device authorization; i.e., encrypted payment account information, and hardware identification verification; i.e., hardware serial number or other uniquely identifying feature for the hardware device 14. Once the system receives at step 670 the required payment device authorization and hardware identification verification, which are transmitted via the hardware ID protection service, the validity of the transaction may be verified and the transaction may be completed by the appropriate financial or merchant service(s) at step 680.

Based on the foregoing description, it will be apparent to those of skill in the art that the present invention provides enhanced security when conducting online transactions, whereby additional verifications are incorporated into the transaction. Rather than just providing the credit card information which can be easily compromised, a user can add additional security to the user's account by complementing this existing verification with hardware-based verification as well. When completing an online transaction, the user will authenticate to the retailer via the credit card information and the user's device will provide a unique hardware identifier to the online retailer during the transaction. This hardware identifier may, for example, take the form of a SIM card id (ISSI) in a mobile device, a unique network-based ID such as a MAC address, or the serial number of the laptop being used to complete the transaction. Other forms of hardware identification may be employed. The retailer may then verify with the credit card issuer that the provided credit card information and the device identifier are linked together and the payment can be completed. Likewise, multiple credit cards and multiple hardware devices may be linked in this manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium; e.g. memory 136 of FIG. 4, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for securing electronic transactions, comprising:
   downloading at least one device driver from a payment card provider; and
   installing said at least one device driver to enable a step of linking a first encrypted payment account information for a first payment device with a first hardware device identifier (ID), said first hardware device ID associated with a first hardware device, whereby said first hardware device ID is hashed and is sent to a payment device issuer's database where a link between said first hardware device and said first payment device is stored;
   receiving, by a payment card processor server computer, a payment authorization request message, the payment authorization request message being generated in response to an electronic payment transaction request made by a user, wherein the payment authorization request message includes the first encrypted payment account information for said first payment device;
   receiving, by the payment card processor server computer, said first hardware device ID associated with said first hardware device, wherein said first hardware device generated said payment authorization request message, wherein the first hardware device is associated with a user payment account for said user;
   determining that the first encrypted payment account information from the received payment authorization request message matches said first hardware device ID; and
   completing a purchase request.

2. The method of claim 1, further comprising:
   linking second encrypted payment account information for a second payment device with said first hardware device ID.

3. The method of claim 1, further comprising:
   linking said first encrypted payment account information for said first payment device with a second hardware device ID associated with a second hardware device adapted to generate the payment authorization request message, wherein the second hardware device is associated with said user payment account for said user.

4. The method of claim 1, further comprising:
   accessing, by said first hardware device, a payment authorization system.

5. The method of claim 4, further comprising:
   linking, by said first hardware device, said first encrypted payment account information for said first payment device with said first hardware device ID that uniquely identifies said first hardware device, thereby establishing said first hardware device as an authorized hardware device,
   wherein said authorized hardware device is linked with said first payment device to enhance security of a monetary transaction conducted electronically via said authorized hardware device.

6. The method of claim 5, further comprising:
   enrolling in a hardware authentication program utilizing said payment authorization system; and
   selecting a range of monetary transactions conducted electronically via said first hardware device, whereby a user may require hardware authentication for only certain online purchases.

7. The method of claim 1, wherein said first payment device is one of a credit card, a debit card, a payment voucher, and a gift card.

8. A method for securing electronic transactions, comprising:
   receiving, by a payment card processor server computer, a payment authorization request message, the payment authorization request message being generated in response to an electronic payment transaction request made by a user, wherein the payment authorization request message includes first encrypted payment account information for a first payment device;

receiving, by the payment card processor server computer, a first hardware device ID associated with a first hardware device that generated said payment authorization request message, wherein the first hardware device is associated with a user payment account for said user;

determining that the first encrypted payment account information from the received payment authorization request message matches said first hardware device ID;

accessing, by the first hardware device, a payment authorization system;

linking, by the first hardware device, said first encrypted payment account information for said first payment device with said first hardware device ID that uniquely identifies said first hardware device, thereby establishing said first hardware device as an authorized hardware device;

wherein said authorized hardware device is linked with said first payment device to enhance security of a monetary transaction conducted electronically via said authorized hardware device;

causing an on-board driver of said first hardware device to send a hash of said first hardware device ID to said payment authorization system to thereby link said first encrypted payment account information for said first payment device with said first hardware device ID; and completing a purchase request.

* * * * *